(12) United States Patent
Iwahara

(10) Patent No.: US 11,716,551 B2
(45) Date of Patent: Aug. 1, 2023

(54) IMAGE CAPTURE APPARATUS AND IMAGE PROCESSING METHOD

(71) Applicant: CANON KABUSHIKI KAISHA, Tokyo (JP)

(72) Inventor: Tomonaga Iwahara, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 26 days.

(21) Appl. No.: 17/578,235

(22) Filed: Jan. 18, 2022

(65) Prior Publication Data
US 2022/0232178 A1    Jul. 21, 2022

(30) Foreign Application Priority Data

Jan. 20, 2021   (JP) ................. 2021-007365

(51) Int. Cl.
*H04N 25/677*    (2023.01)
*H04N 25/60*     (2023.01)
*H04N 25/75*     (2023.01)

(52) U.S. Cl.
CPC ........... *H04N 25/677* (2023.01); *H04N 25/60* (2023.01); *H04N 25/75* (2023.01)

(58) Field of Classification Search
CPC ...... H04N 25/46; H04N 25/60; H04N 25/677; H04N 25/75
See application file for complete search history.

(56) References Cited

U.S. PATENT DOCUMENTS

| 8,736,717 B2* | 5/2014 | Ise ..................... H04N 23/843 348/222.1 |
| 9,319,610 B2* | 4/2016 | Wakabayashi ......... H04N 25/79 |
| 9,686,450 B2* | 6/2017 | Ino ....................... H04N 25/67 |

FOREIGN PATENT DOCUMENTS

JP     6579782 B2    9/2019

* cited by examiner

*Primary Examiner* — Lin Ye
*Assistant Examiner* — Chriss S Yoder, III
(74) *Attorney, Agent, or Firm* — Cowan, Liebowitz & Latman, P.C.

(57) ABSTRACT

An image capture apparatus that comprises an image sensor that includes a pixel array in which a plurality of pixels are disposed in rows and columns and a plurality of column signal lines provided for each column of the pixels, is disclosed. The apparatus further comprises a first correction circuit and a second correction circuit that share application of correction of offset caused by a difference in column signal lines where the pixel signals are read out to.

18 Claims, 11 Drawing Sheets

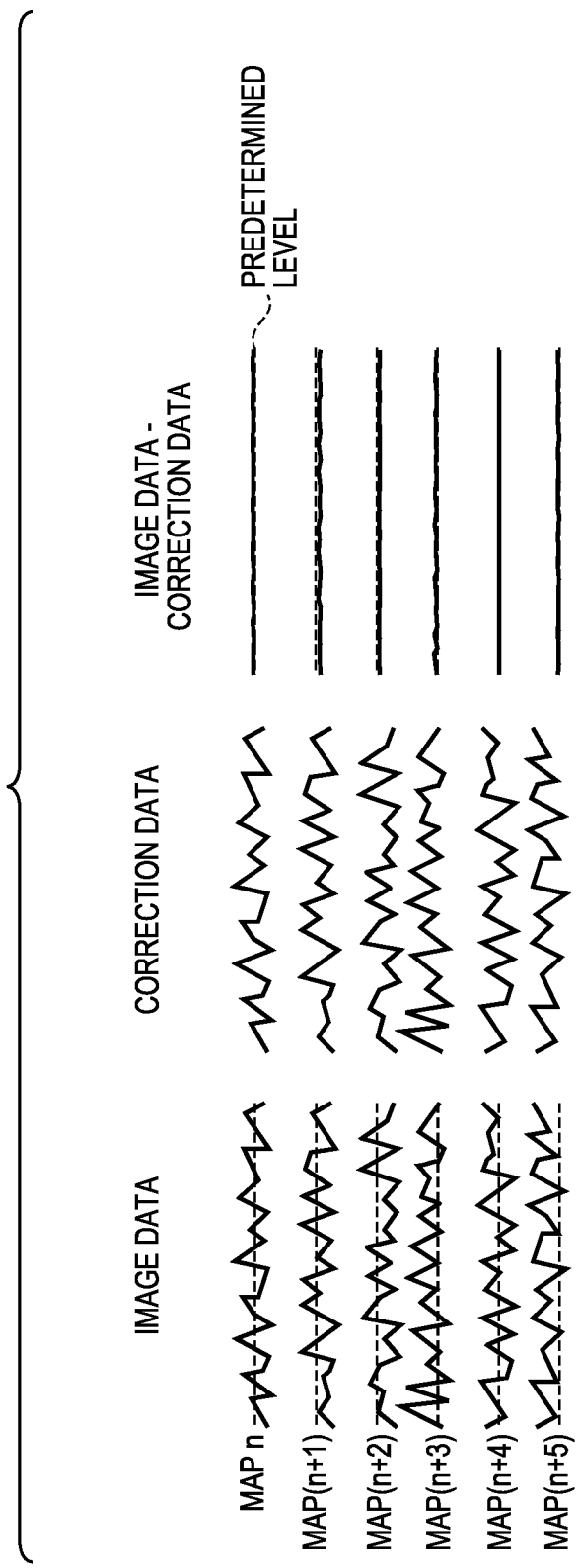

FIG. 9A
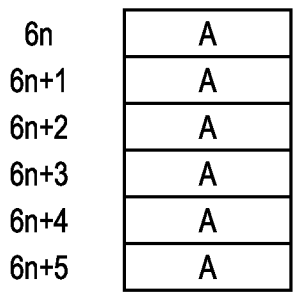 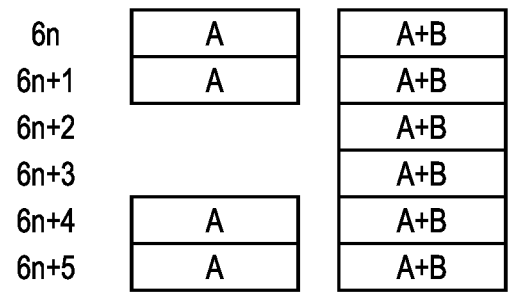
FIG. 9B
FIG. 10
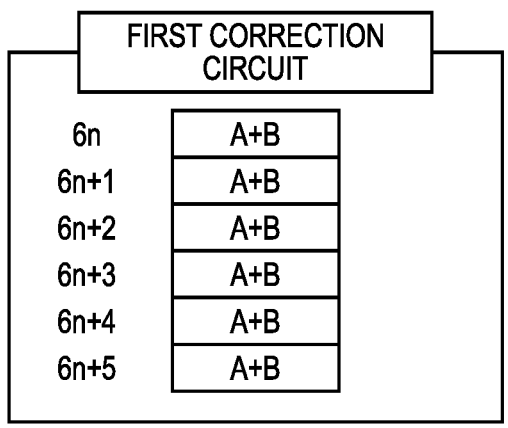 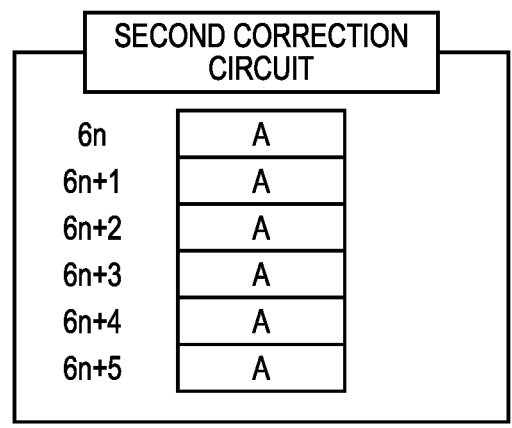
FIG. 11
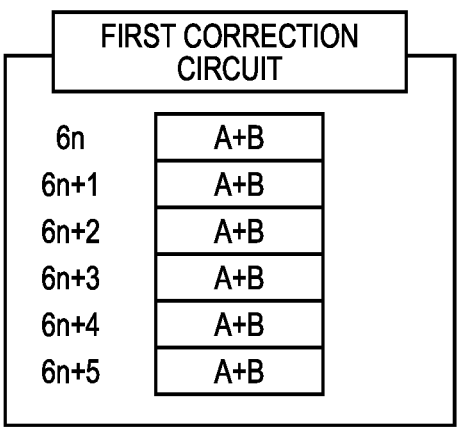 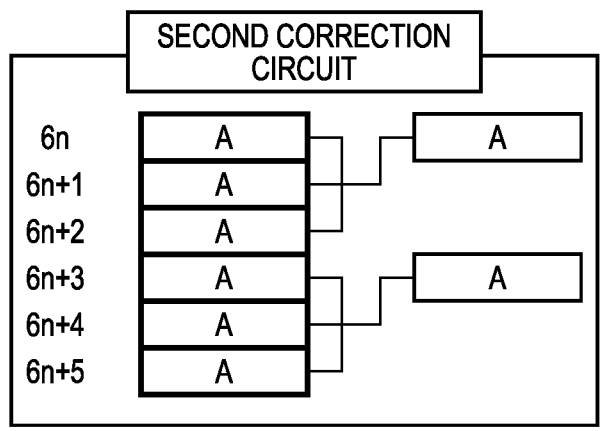

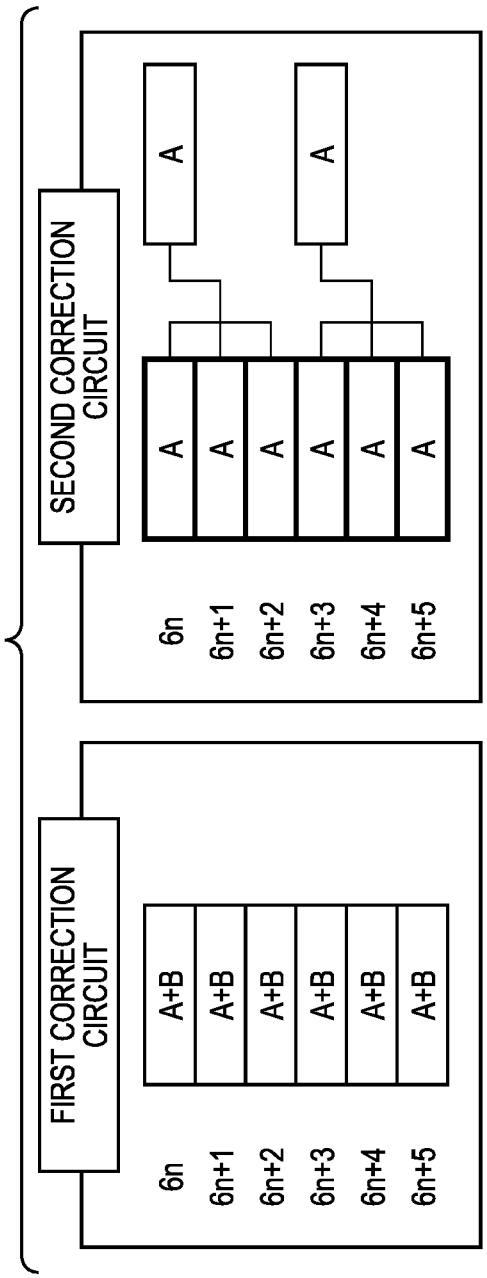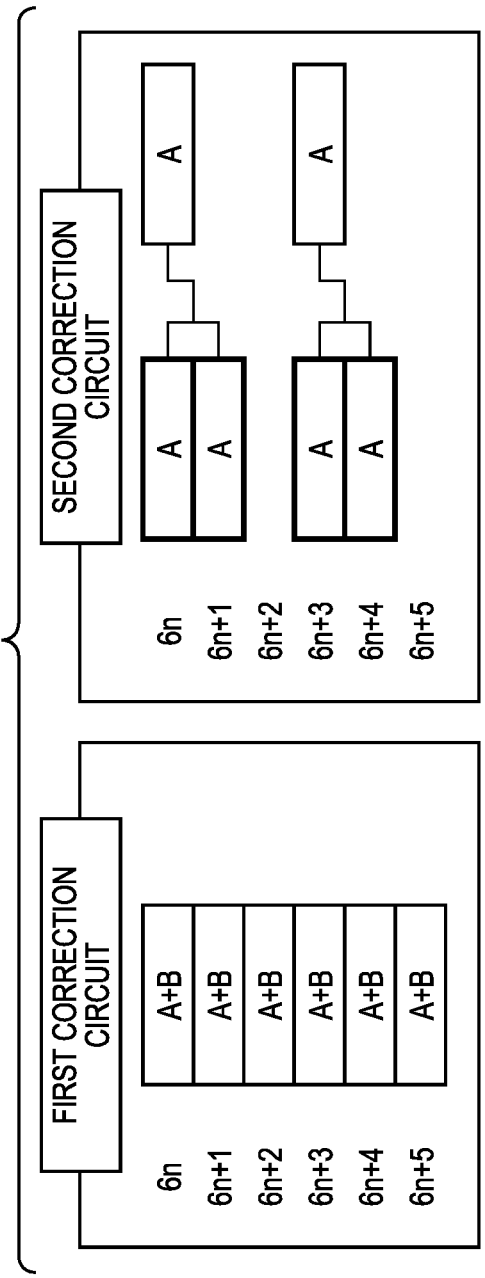

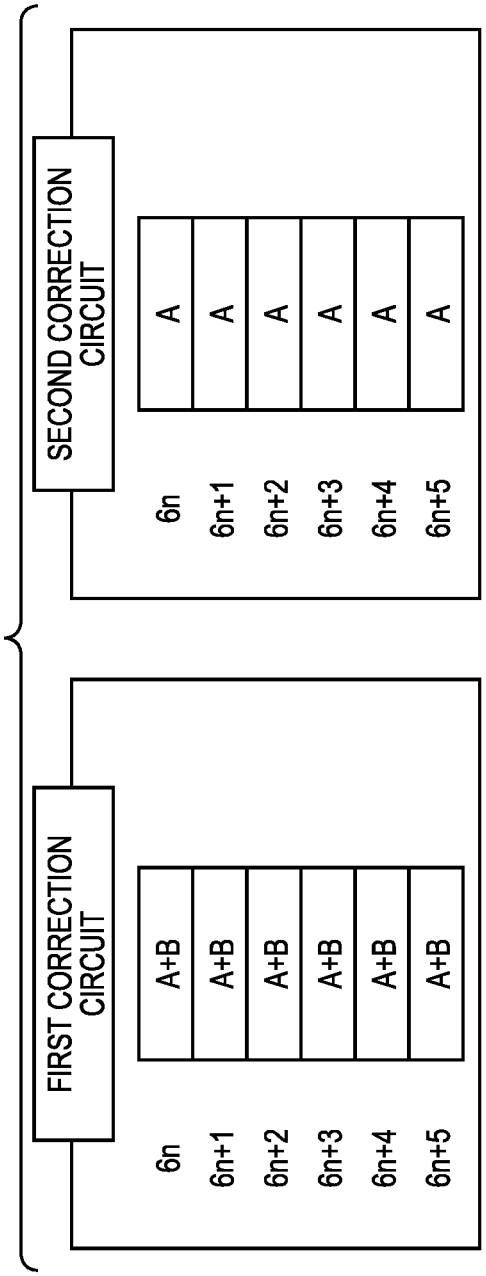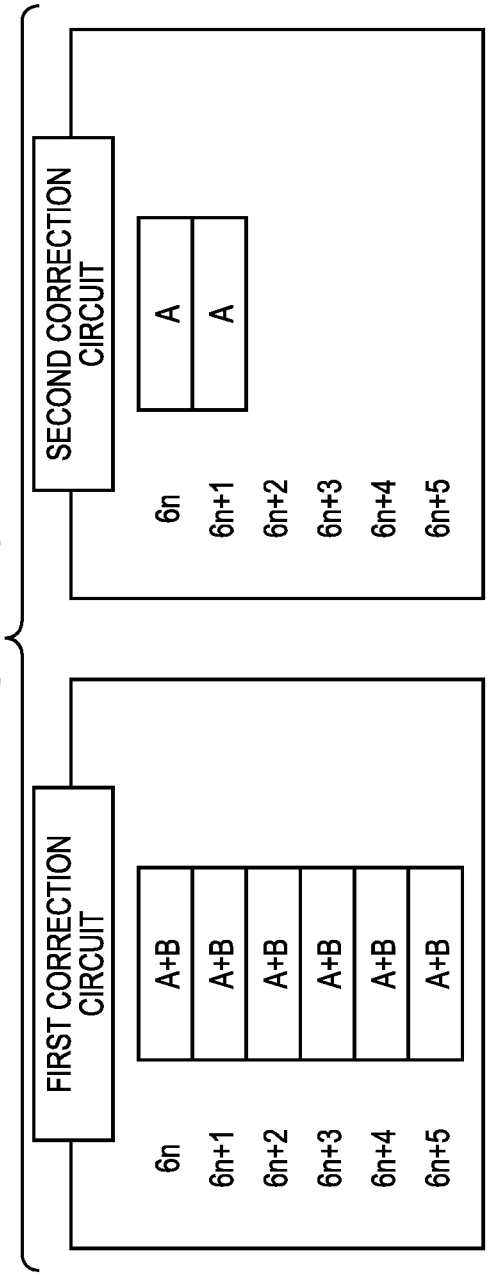

IMAGE CAPTURE APPARATUS AND IMAGE PROCESSING METHOD

BACKGROUND OF THE INVENTION

Field of the Invention

The present invention relates to an image capture apparatus and an image processing method and particularly relates to image correction technology.

Description of the Related Art

An image sensor is used in an image capture apparatus such as a digital (video) camera. In the image sensor, from hundreds to thousands of tiny pixels are formed, and a voltage value corresponding to the amount of charge that accumulates in each pixel via photoelectric conversion is acquired as an image signal.

Unevenness in the signal value caused by unevenness generated in the characteristics of the photodiode or transistor of each pixel corresponds to a noise component in the image signal. Thus, correction needs to be applied to the read out image signal to remove or suppress the noise component.

Also, there may also be unevenness in the characteristics in a readout circuit (a vertical signal line and a column circuit) provided for each pixel column for reading the signal from the pixel. Thus, because of the effects of the unevenness characteristics in the readout circuit on the pixel signal, correction needs to be performed.

In Japanese Patent No. 6579782, an image capture apparatus in which a plurality of readout circuits are provided for each pixel column is described. The image capture apparatus corrects the unevenness in the characteristics using a correction value of each readout circuit.

In order to correct the unevenness in the characteristics of the readout circuit at a high accuracy, correction values that are different for each readout circuit and for each type of signal read out need to be used. For example, there is a case where each pixel includes two subpixels A and B and a pixel signal is read out collectively from the subpixels A and B, and there is a case where a pixel signal can be read out from each the subpixel A or the subpixel B. Different correction values need to be used in these cases. Thus, in a case where two types of signals can be read out from each pixel and six vertical signal lines are provided for each pixel column, twelve types of correction values are required.

By increasing the number of correction values needed to be stored, the required memory capacity is increased and the cost of components is increased. Also, an increase in the amount of time taken to read out the correction values from the memory when running the image capture apparatus causes a decrease in the responsiveness of the image capture apparatus.

Furthermore, there are limitations to the data amount and data rate able to be communicated in one frame to the correction circuit for correcting the image signal. Accordingly, an increase in the number of correction values used may restrict the amount of image data able to be transmitted to the correction circuit and may impede any improvement to the shooting frame rate or the number of pixels per frame.

SUMMARY OF THE INVENTION

An aspect of the present invention is directed at providing an image capture apparatus capable of implementing appropriate correction while suppressing an increase in the number correction values and a method for controlling the image capture apparatus.

According to an aspect of the present invention, there is provided an image capture apparatus, comprising: an image sensor that includes a pixel array in which a plurality of pixels are disposed in rows and columns and a plurality of column signal lines provided for each column of the pixels, the image sensor being capable of reading out a plurality of types of pixel signals including a first pixel signal and a second pixel signal from the pixel array; a first correction circuit; and a second correction circuit, wherein the first correction circuit and the second correction circuit share application of correction of offset caused by a difference in column signal lines where the pixel signals are read out to.

According to another aspect of the present invention, there is provided a control method for an image capture apparatus including an image sensor that includes a pixel array in which a plurality of pixels are disposed in rows and columns and a plurality of column signal lines provided for each column of the pixels, the image sensor being capable of reading out a plurality of types of pixel signals including a first pixel signal and a second pixel signal from the pixels, a first correction circuit, and a second correction circuit, the method comprising: controlling the first correction circuit and the second correction circuit to share applying correction of offset caused by a difference in column signal lines where the pixel signals are read out to.

According to further aspect of the present invention, there is provided a non-transitory computer-readable medium storing a program executable by a computer included in an image capture apparatus, wherein the image capture apparatus including an image sensor that includes a pixel array in which a plurality of pixels are disposed in rows and columns and a plurality of column signal lines provided for each column of the pixels, the image sensor being capable of reading out a plurality of types of pixel signals including a first pixel signal and a second pixel signal from the pixels, a first correction circuit, and a second correction circuit, the program, when executed by the computer, causes the computer to implement a control method for an image capture apparatus comprising, controlling the first correction circuit and the second correction circuit to share applying correction of offset caused by a difference in column signal lines where the pixel signals are read out to.

Further features of the present invention will become apparent from the following description of exemplary embodiments (with reference to the attached drawings).

BRIEF DESCRIPTION OF THE DRAWINGS

FIG. 8 is a diagram for describing offset correction.

FIGS. 9A and 9B are diagrams illustrating a read out method of an image sensor according to an embodiment.

FIG. 10 is a schematic diagram of a read out operation and a correction operation according to a first embodiment.

FIG. 11 is a schematic diagram of a read out operation and a correction operation according to a second embodiment.

FIGS. 12A and 12B are schematic diagram of a read out operation and a correction operation according to a third embodiment.

FIGS. 13A and 13B are schematic diagrams of a read out operation and a correction operation according to a fourth embodiment.

DESCRIPTION OF THE EMBODIMENTS

Figure 1:
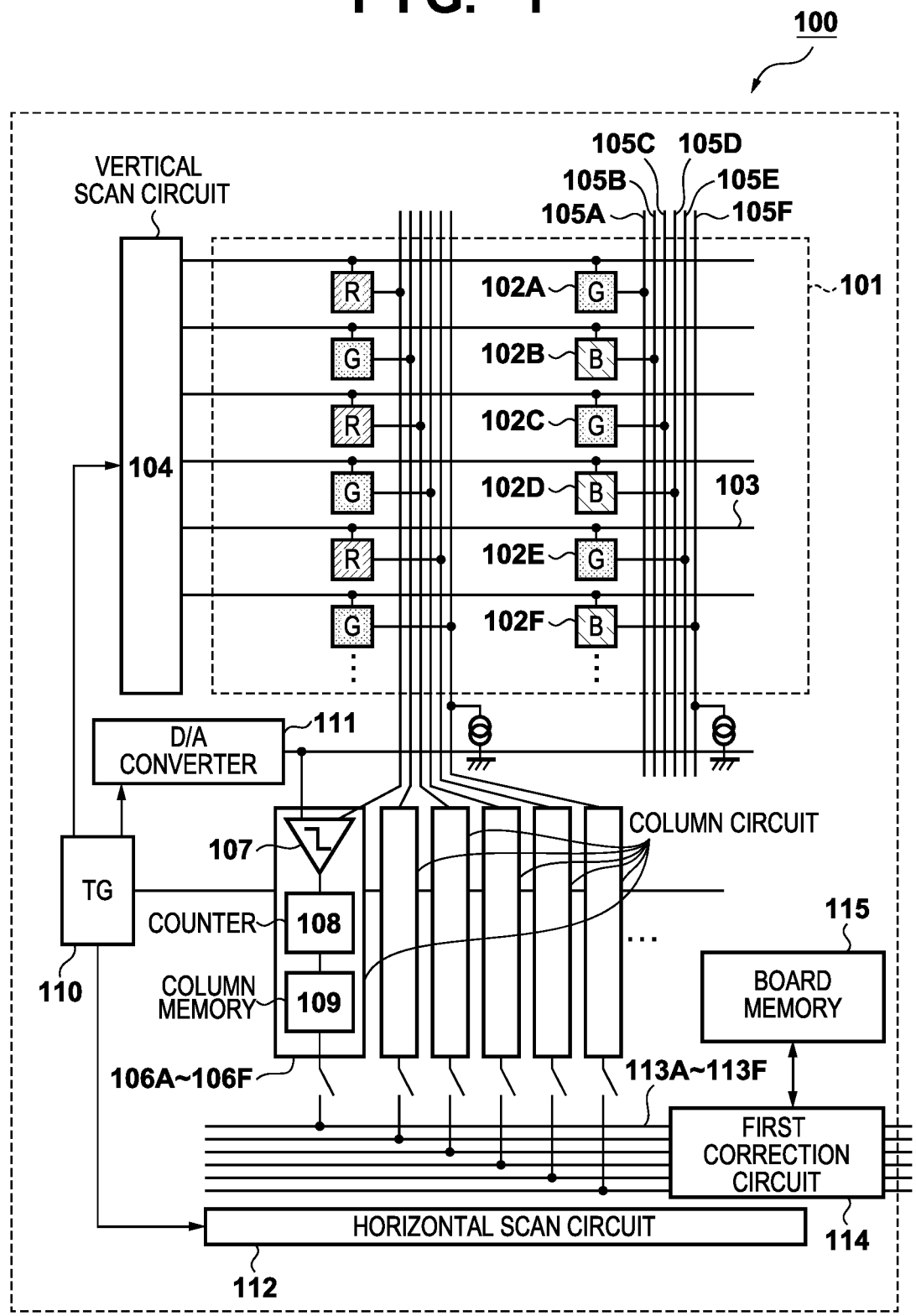
FIG. 1 is a diagram illustrating an example configuration of a pixel and peripheral circuits of an image sensor according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted. Note that in the embodiments described below, the present invention is embodied as an image capture apparatus which is a digital camera or a digital video camera. However, the present invention can be implemented with any electronic device with an image capture function. Examples of such an electronic device include computer devices (personal computers, tablet computers, media players, PDAs, and the like), mobile phones, smartphones, game consoles, robots, drones, and drive recorder. Note that these are examples, and the present invention can be implemented with other electronic devices.

First Embodiment

FIG. 1 is a block diagram illustrating an example configuration of an image sensor according to an embodiment of the present invention. An image sensor 100 includes a pixel portion 101 in which a plurality of pixels 102 are disposed in rows and columns. The pixel portion 101 may be referred to as a pixel array. In the pixel portion 101, a primary-color Bayer arrangement color filter is provided. In FIG. 1, the letters R, G, B on the pixels 102 represent the color of the color filter provided to the pixel. Also, for each pixel column, six vertical signal lines (column signal lines) are provided. Note that the number of vertical signal lines for each pixel column used here is an example, and a discretionary number, such as four, twelve, twenty, or the like, may be used. In FIG. 1, of the hundreds to thousands of pixels provided in the pixel portion 101, only twelve pixels in six rows and two columns are illustrated.

A pixel 102A is connected to a vertical signal line 105A via a non-illustrated selection switch and outputs a pixel signal per row to a column circuit 106A. The pixel of the 6n+1-th row (n is an integer equal to or greater than 0) is connected to the vertical signal line 105A for each row from the first row to the sixth row. In a similar manner, the pixel of the 6n+2-th row is connected to a vertical signal line 105B, the pixel of the 6n+3-th row is connected to a vertical signal line 105C, the pixel of the 6n+4-th row is connected to a vertical signal line 105D, the pixel of the 6n+5-th row is connected to a vertical signal line 105E, and the pixel of the 6(n+1)-th row is connected to a vertical signal line 105F. Also, the vertical signal lines 105A to 105F are each connected to the corresponding column circuit 106A to 106F.

The turning on and off of the selection switch is controlled per pixel row by a signal line 103 connected to a vertical scan circuit 104. In the present embodiment, the vertical scan circuit 104 can simultaneously control the selection switch for the plurality of pixel rows, allowing a signal to be read out from a maximum of six pixel rows worth of the pixels 102 at one time.

A timing generator (TG) 110 outputs a pulse signal for controlling the operation of the vertical scan circuit 104 and a horizontal scan circuit 112. The vertical scan circuit 104 controls the operation of the transistor of each pixel 102 of the pixel portion 101 on the basis of a pulse signal output from the TG 110. The TG 110 also outputs a reference signal used by a D/A converter 111. The D/A converter (DAC) 111 generates a reference signal (a slope signal or a ramp signal) that changes voltage with time and supplies the reference signal to a comparator 107 of a column circuit 106.

Next, the configuration of the column circuit 106 will be described. The column circuit 106 is provided for each vertical signal line 105, and, in FIG. 1, column circuits from 106A to 106F corresponding to the vertical signal lines 105A to 105F are formed.

The column circuit 106 is constituted by the comparator 107, a counter 108, and a column memory 109. One input of the comparator 107 is a reference signal generated by the DAC 111, and the other input of the comparator 107 is a pixel signal from the vertical signal line 105.

The comparator 107 compares the voltage value (electric potential V) of the pixel signal input from the vertical signal line 105 and the voltage value of the reference signal and changes the level of the output signal as the size relationship between the two signals changes. The output signal of the comparator 107 controls the operation of the counter 108. The counter 108 measures the number of pulses of a clock pulse input from a non-illustrated signal source. The counter 108 stops measuring the number of pulses according to an output signal of the comparator 107 and outputs the measurement value at that time. The measurement value of the counter 108 is a digital value corresponding to the voltage value of the pixel signal. Note that time may be measured instead of the number of pulses. The measurement value of the counter 108 is held in the column memory 10). Also, the measurement value of the counter 108 is reset.

In this manner, the pixel signals input from the vertical signal lines 105 corresponding to the column circuits 106 are converted into digital signals with a value within a predetermined range (for example, from 0 to 255), and the function of an A/D converter is realized. The column circuit 106A is connected to a horizontal signal line 113A via a switch that is controlled to turn on and off by the horizontal scan circuit 112. In a similar manner, column circuits 106B to 106F are connected to horizontal signal lines 113B to 113F.

The horizontal scan circuit 112 controls turning the switch on and off and outputs the digital signal held in the column memory 109 of the column circuit 106 to the horizontal signal lines 113A to 113F. The operation of the horizontal scan circuit 112 is controlled by a control signal supplied from the TG 110. The digital signal output to the horizontal signal lines 113A to 113F is supplied to a first correction circuit 114. The first correction circuit 114 applies an offset correction to the digital signal according to the settings set by a control circuit 406 described below or outputs the digital signal to outside of the image sensor 100 without applying offset correction. Aboard memory 115 is memory, for example, DRAM, used when the first correction circuit 114 applies offset correction. The first correction circuit 114 will be described in detail below.

Figure 2:
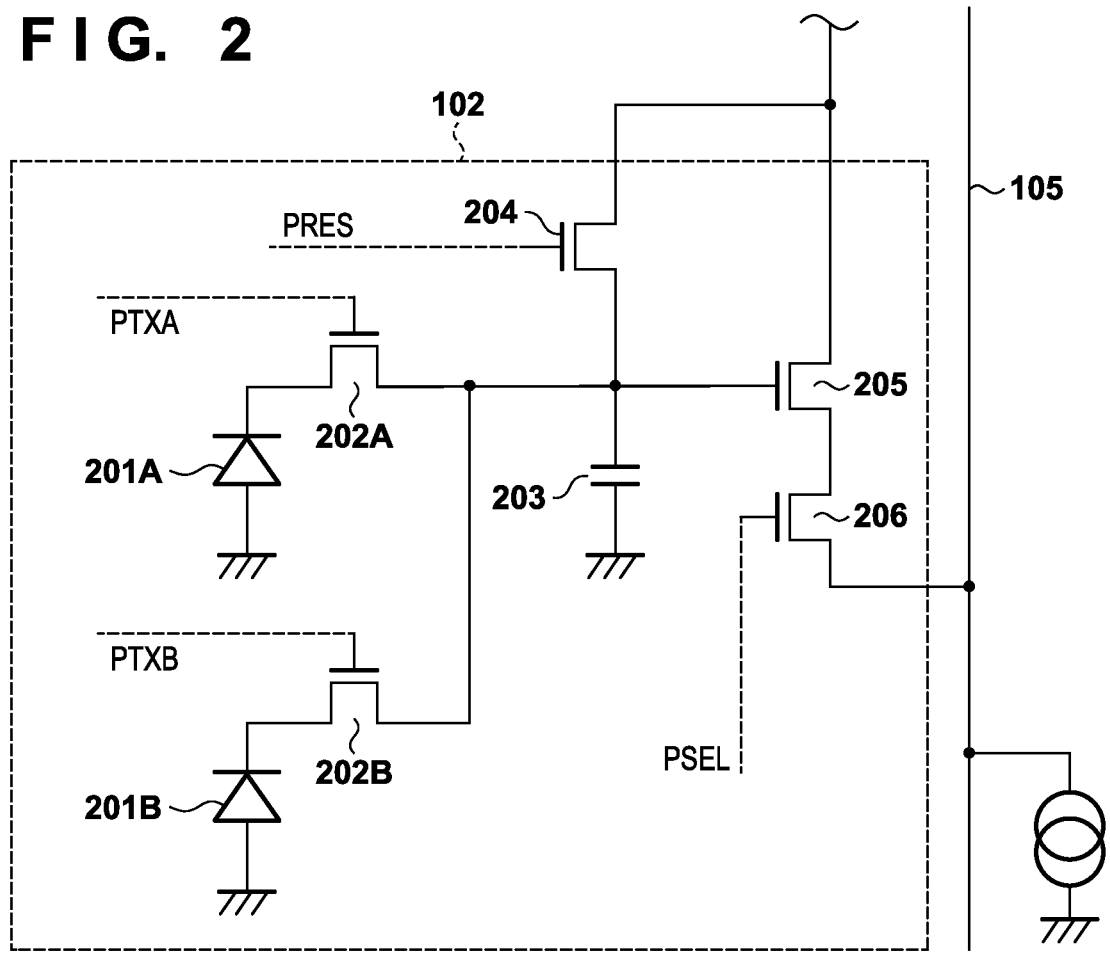
FIG. 2 is a diagram illustrating an example configuration of a pixel in an image sensor according to an embodiment.

FIG. 2 is a circuit diagram illustrating an example configuration of the pixel 102. The pixel 102 includes a plurality of photodiodes (PD) 201A and 201B that share a single micro lens (not illustrated). The PD 201A and the PD 201B each function as a photoelectric conversion unit that generates a charge in accordance with the amount of incident light. The PD 201A and the PD 201B may also be referred to as subpixels.

Hereinafter, a signal based on the charge generated by the PD 201A is referred to as signal A. and a signal based on the charge generated by the PD 201B is referred to as signal B. Also, a signal that is a combination of the signal A and the signal B obtained in the same pixel is referred to as a signal A+B. The image formed from the signal A and the image formed from the signal B are a pair of parallax images. Also, by using the signal A column and the signal B column obtained from the plurality of pixels 102, automatic focus detection (AF) using a phase difference detection method can be performed. Thus, the signal A and the signal B may be referred to as focus detection signals or AF signals.

Also, the signal A+B can be considered an image signal obtained by a typical image sensor in which the pixel 102 including a single PD. Thus, in a case where the signal A and the signal B are referred to as focus detection signals, the signal A+B may be referred to as an image signal or a shooting image signal. Note that the signal A may be obtained by subtracting the signal B from the signal A+B, or the signal B may be obtained by subtracting the signal A from the signal A+B. Pixel signal means a signal read out from a pixel and may be the signal A+B, the signal A, the signal B, or a reset signal N described below.

The PD 201A and the PD 201B are connected to a shared floating diffusion (referred to as FD below) 203, the PD 201A via a transfer switch 202A and the PD 201B via a transfer switch 202B. Turning the transfer switch 202A on and off is controlled by a transfer pulse PTXA, and turning the transfer switch 202B on and off is controlled by a transfer pulse PTXB. The transfer pulse PTXA and the transfer pulse PTXB are obtained from the vertical scan circuit 104.

The FD 203 indicates the voltage based on the amount of charge transferred by temporarily accumulating a charge transferred from the PD 201A and/or the PD 201B. Thus, the FD 203 has the function of converting charge to voltage.

A reset switch 204 supplies a reference potential VDD to the FD 203. Turning the reset switch 204 on and off is controlled by a reset pulse PRES supplied by the vertical scan circuit 104.

A pixel amplifier 205 is a source follower circuit including a MOS transistor and a constant current source. A selection switch 206 outputs the electric potential variation of the pixel amplifier 205 to vertical signal line 105. Turning the selection switch 206 on and off is controlled by a selection pulse PSEL supplied by the vertical scan circuit 104.

The transfer switch 202A, the transfer switch 202B, the reset switch 204, and the selection switch 206 are each a MOS transistor.

Figure 3:
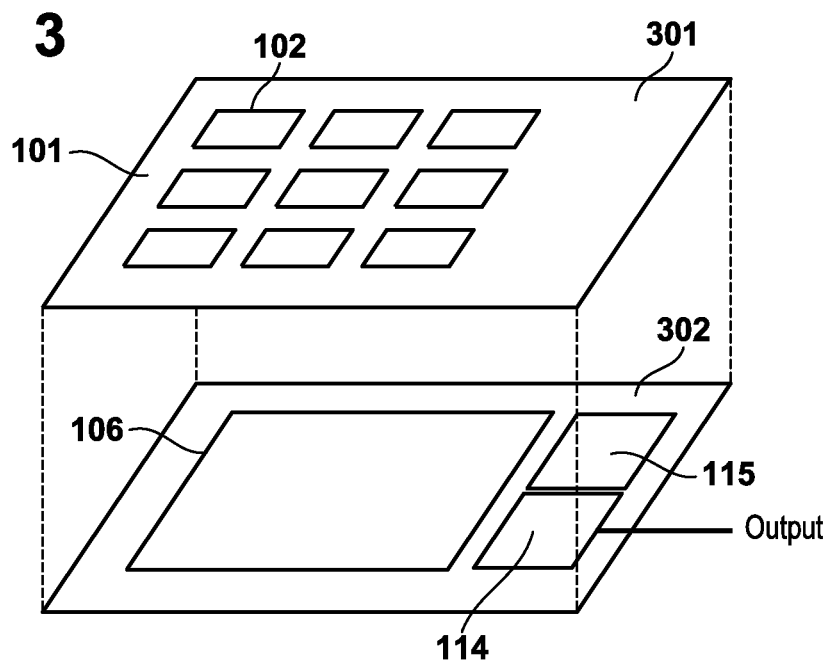
FIG. 3 is a schematic diagram illustrating the stacked structure of an image sensor according to an embodiment.

FIG. 3 is a perspective view schematically illustrating a mounting example of the image sensor 100. The image sensor 100 may have a stacked structure mainly including a first semiconductor substrate 301, where the pixel portion 101 is formed, and a second semiconductor substrate 302, where a readout circuit like the column circuit 106, the first correction circuit 114, and the board memory 115 are formed. The first semiconductor substrate 301 and the second semiconductor substrate 302, for example, are electrically connected via a bump, and the column circuit 106 mounted on the second semiconductor substrate 302 can receive a pixel signal read out from the pixel 102 provided in the first semiconductor substrate 301.

Figure 4:
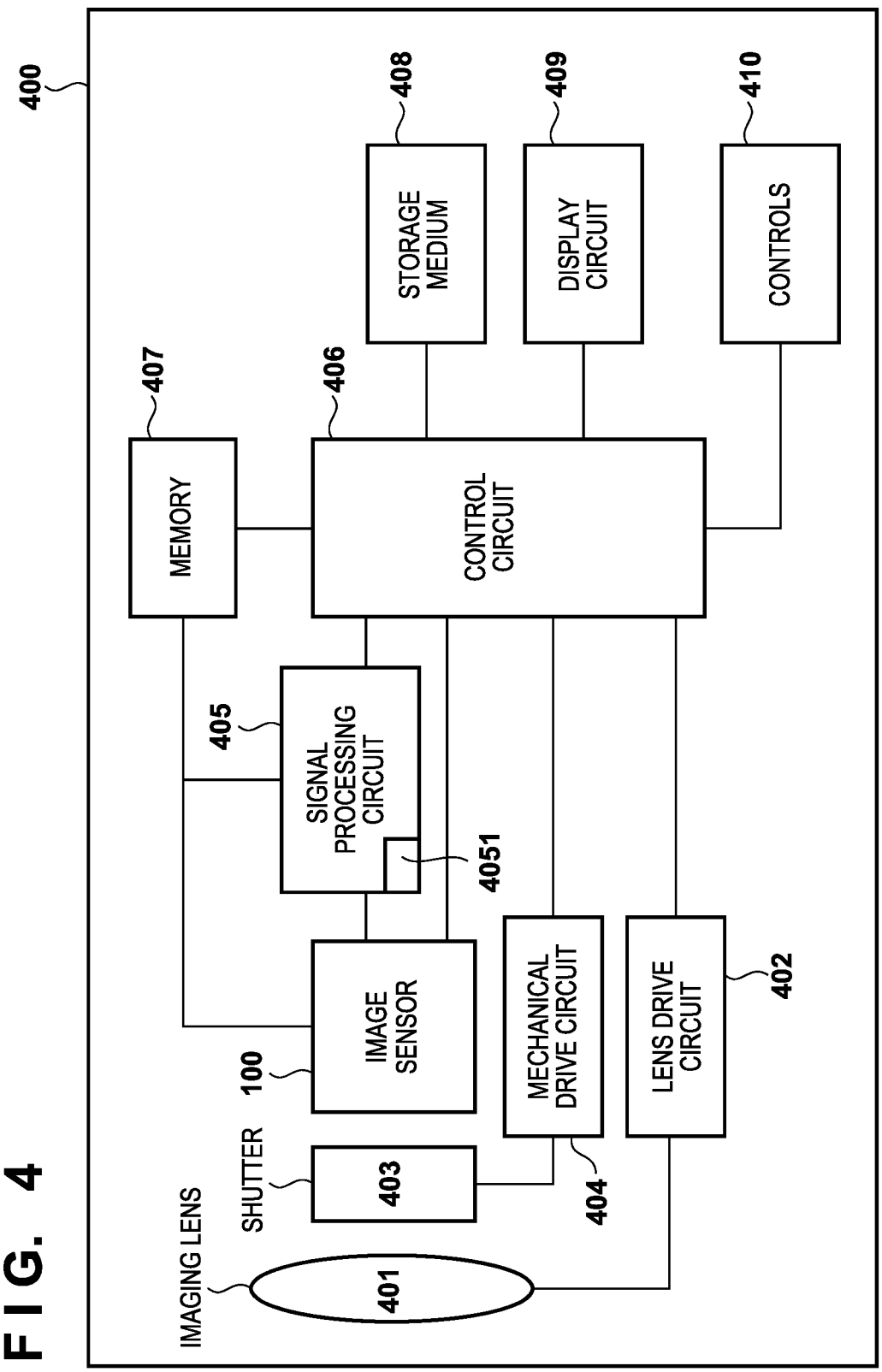
FIG. 4 is a block diagram illustrating an example configuration of an image capture apparatus according to an embodiment.

FIG. 4 is a block diagram illustrating an example configuration of an image capture apparatus 400, which is an example of an electronic apparatus using the image sensor 100.

An imaging lens 401 forms an optical image of a subject on an imaging surface of the image sensor 100. The imaging lens 401 may be detachable from the electronic device, allowing the imaging lens 401 to be replaced. The imaging lens 401 includes a movable lens such as a focus lens and a diaphragm. The operation of the movable lens and the diaphragm are controlled by the control circuit 406 via a lens drive circuit 402.

A shutter 403 is a mechanical shutter that controls the exposure amount of the image sensor 100. The operation of the shutter 403 is controlled by the control circuit 406 via a mechanical drive circuit 404. Note that in a case where the diaphragm doubles as a mechanical shutter, a configuration may be used in which the mechanical drive circuit 404 drives the diaphragm and the lens drive circuit 402 drives the movable lens.

A signal processing circuit 405 applies a predetermined image processing to the signal obtained from the image sensor 100 and corrects the signal, generates a different signal, generates image data, acquires and/or generates various types of information, and the like. The signal processing circuit 405 also performs the offset correction processing described below. The signal processing circuit 405 may be, for example, a dedicated hardware such as an application-specific integrated circuit (ASIC) designed to realize a specific function or may be configured to realize a specific function via a programmable processor such as a digital signal processor (DSP) executing a software. Alternatively, the control circuit 406 may also functions as at least a portion of the signal processing circuit 405.

The image processing applied by the signal processing circuit 405 includes preprocessing, color interpolation processing, correction processing, detection processing, data modification processing, evaluation value calculation processing, special effects processing, and the like.

The preprocessing includes offset correction, signal amplification, reference level adjustment, defective pixel correction, and the like.

The color interpolation processing is processing for interpolating values of color components not obtained when shooting, and is also referred to as demosaicing processing or synchronization processing.

The correction processing includes white balance adjustment, gradation correction (gamma processing), processing for correcting the effects of optical aberration or vignetting of the imaging lens 401, processing for correcting color, and the like.

The detection processing includes processing for detecting a feature area (for example, a face area or a human body area) or movement thereof, processing for recognizing a person, and the like.

The data modification processing includes combining processing, scaling processing, encoding and decoding processing, header information generation processing, and the like.

The evaluation value calculation processing includes processing for generating signals or evaluation values that are used in automatic focus detection (AF), processing for calculating evaluation values that are used in automatic exposure control (AE), and the like.

Special effects processing includes processing for adding blurring, changing color tone, relighting processing, and the like. Note that these are examples of the image processing that can be applied by the signal processing circuit 405 and are not intended to limit the image processing applied by the signal processing circuit 405. Also, it is not necessary that the signal processing circuit 405 can apply all of the types of image processing described above.

The control circuit 406 includes a CPU (also referred to as an MPU or microprocessor), ROM, and RAM, for example. By reading a program stored in the ROM into the RAM and executing the program, the control circuit 406 can control the operations of the units of the image capture apparatus 400 and implement the functions of the image capture apparatus 400. Note that in a case where the imaging lens 401 is a replaceable type, the control circuit 406 controls the operation of the imaging lens 401 while communicating with the control circuit of the imaging lens 401.

Memory 407 is used for holding image data and offset correction values, for example. The memory 407 can be accessed from both the first correction circuit 114 of the image sensor 100 and a second correction circuit 4051 of the signal processing circuit 405 provided outside of the image sensor 100. Note that the second correction circuit 4051 may not be a portion of the signal processing circuit 405, and the signal processing circuit 405 may function as the second correction circuit 4051.

A storage medium 408 is a detachable memory card, for example, that is used for recording data (for example, captured image data) or the like based on a signal acquired using the image sensor 100.

A display circuit 409 includes a display device such as an LCD, for example, and displays information of the image capture apparatus 400, captured images and information thereof, GUI images, and the like.

Controls 410 generically represent variety kinds of input devices provided for a user to provide instructions to the image capture apparatus 400. Typical input devices include a button and a switch. Also, in a case where the display circuit 409 is a touch display, the touch panel of the touch display is included in the controls 410. An input device included in the controls 410 may be given a name corresponding to its allocated function, such as a shutter button, a power button, an OK button, a directional key, a menu button, and the like. Note that the function allocated to the same input device can change depending on the operation mode of the image capture apparatus 400 or the like.

Figure 5:
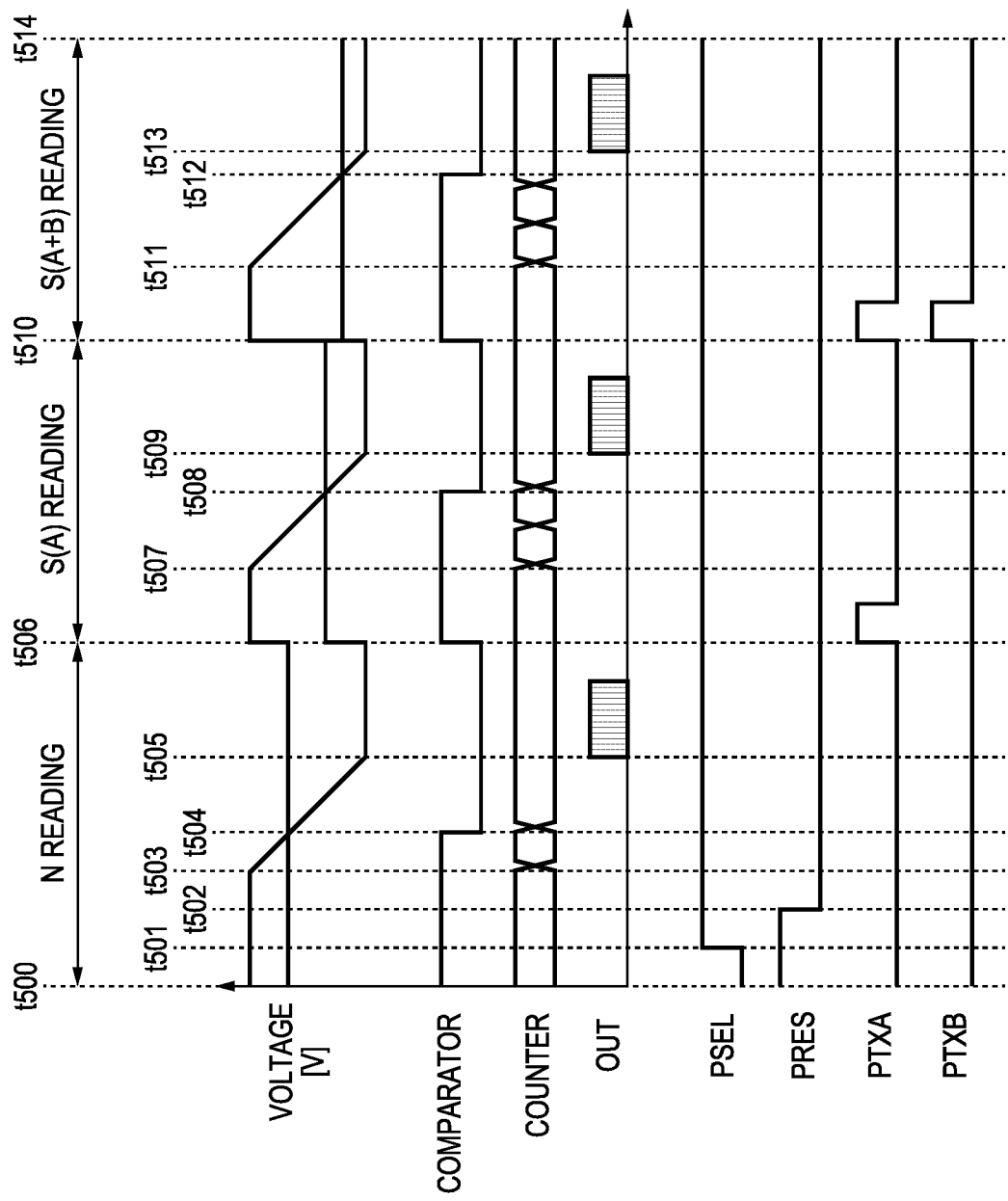
FIG. 5 is a timing chart illustrating a first read out operation according to an embodiment.

FIG. 5 is an example of a timing chart when a signal is read out from the image sensor 100. In the present embodiment, the image sensor 100 includes a first to third read out mode. FIG. 5 is a timing chart of the operations in the first read out mode. Note that in the first read out mode, the reset signal N, the image signal (signal A+B), and the focus detection signal (signal A) are read out from the image sensor 100.

Before time 1500, the pixel 102 is reset by the reset pulse PRES being set to Hi and the transfer pulses PTX being set to Hi. At time t500, the transfer pulses PTX is set to Lo to release the reset of the pixel 102, and charge accumulation begins. As described above, these control pulses are supplied from the vertical scan circuit 104 to the pixel 102 on the basis of a control signal supplied from the TG 110.

At time t501, the selection pulse PSEL of a pixel row that reads out a signal is set to Hi, and the pixel 102 in the pixel row is connected to the vertical signal line 105.

At time t502, the reset pulse PRES changes from Hi to Lo. This makes the electric potential V (reset signal N) of the FD 203 at the reset time to be input to the comparator 107 via the vertical signal line 105. The reset signal N is used to remove reset noise generated when resetting the pixel 102.

At time t503, the DAC 111 starts outputting a reference signal VL with a voltage level that (ramp signal) that increases or decreases in line shape with time.

In the example of FIG. 5, the reference signal VL with a decreasing line shape is used. When the DAC 111 outputs the reference signal VL, the counter 108 starts counting pulses.

At time t504, when the size relationship between the reset signal N and the reference signal VL is reversed, the output level of the comparator 107 changes from Hi to Lo. When the output level of the comparator 107 changes from Hi to Lo, the count value of the counter 108 is held in the column memory 109.

Thereafter, after the reference signal VL transitions to reach a predetermined lower limit value at time t505, when a count value corresponding the reset signal N is output from the column circuit 106 via the horizontal scan circuit 112, reading out of the reset signal N (N reading) of the pixel 102 ends.

At time 1506, when the transfer pulse PTXA changes to Hi, the charge accumulated in the PD 201A is transferred to the FD 203. Because of this, the electric potential V of the vertical signal line 105 becomes the electric potential corresponding to the charge accumulated in the PD 201A. This electric potential corresponds to the value of the signal A. Also, at the time t506, the comparator 107 is reset.

At time t507, the DAC 111 starts outputting the reference signal VL again. When the DAC 111 outputs the reference signal VL, the counter 108 starts counting pulses.

At time t508, when the size relationship between the signal A and the reference signal VL is reversed, the output level of the comparator 107 changes from Hi to Lo. When the output level of the comparator 107 changes from Hi to Lo, the count value of the counter 108 is held in the column memory 109.

Thereafter, after the reference signal VL transitions to reach a predetermined lower limit value at time t509, when a count value corresponding the signal A is output from the column circuit 106 via the horizontal scan circuit 112, reading out of the signal A (A reading) of the pixel 102 ends.

At time t510, when the transfer pulse PTXA and the transfer pulse PTXB both change to Hi, the charge accumulated in the PD 201A and the PD 201B are transferred to the FD 203. Because of this, the electric potential V of the vertical signal line 105 becomes the electric potential corresponding to the charge accumulated in the PD 201A and the PD 201B. This electric potential corresponds to the value of the signal A+B. Also, at the time t510, the comparator 107 is reset.

At time t511, the DAC 111 starts outputting the reference signal VL again. When the DAC 111 outputs the reference signal VL, the counter 108 starts counting pulses.

At time t512, when the size relationship between the signal A+B and the reference signal is reversed, the output level of the comparator 107 changes from Hi to Lo. When the output level of the comparator 107 changes from Hi to Lo, the count value of the counter 108 is held in the column memory 109.

Thereafter, after the reference signal VL transitions to reach a predetermined lower limit value at time t513, when a count value corresponding the signal A+B is output from the column circuit 106 via the horizontal scan circuit 112, reading out of the signal A+B (A+B reading) of the pixel 102 ends.

Thereafter, predetermined signal processing, such as subtracting the reset signal N from both the signal A and the signal A+B, is performed. Also, signal B is obtained by subtracting the signal A from the signal A+B. In this manner, the image signal (signal A+B) is obtained from the pixel 102 and the focus detection signal (the signal A and the signal B) is obtained.

FIG. 5 illustrates the operation of reading out from a single pixel 102. However, by performing the same operation in parallel for the plurality of pixels 102 connected to the vertical signal lines 105A to 105F and the corresponding column circuits 106A to 106F, signal from a maximum of six pixel rows can be read out in parallel.

Figure 6:
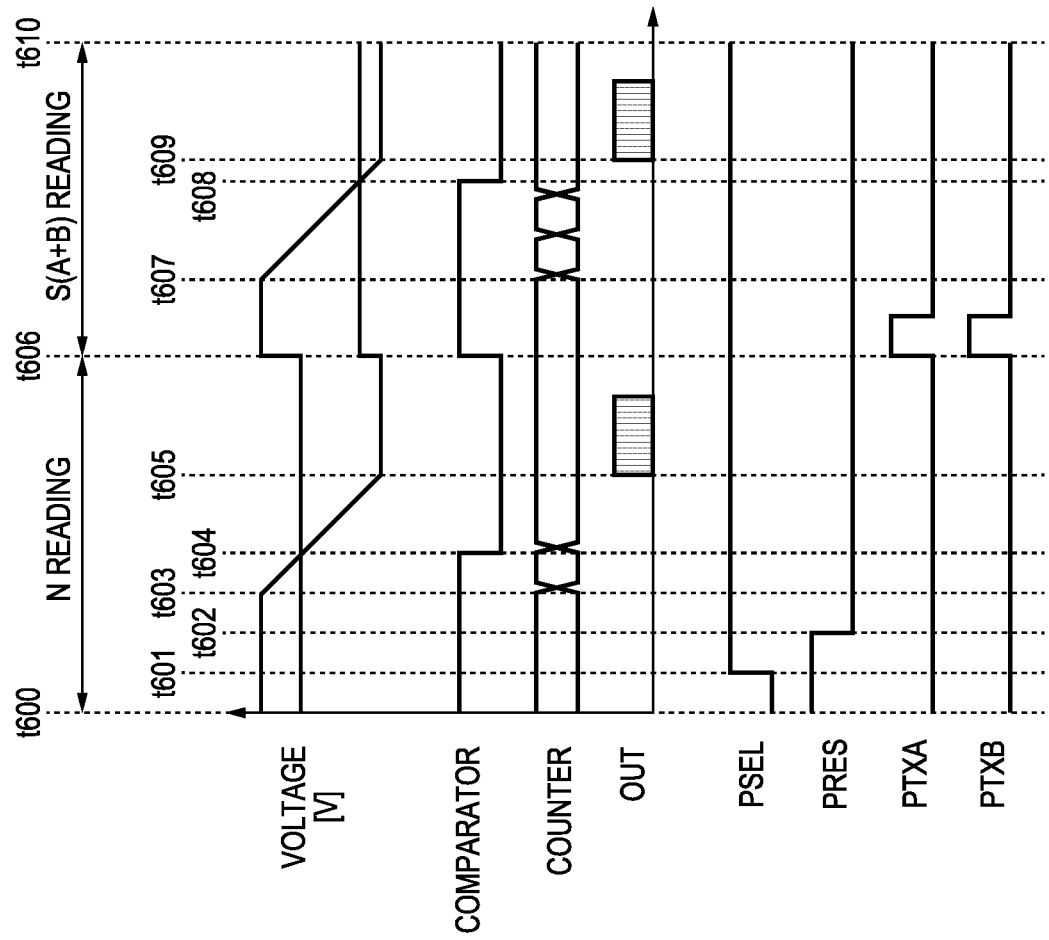
FIG. 6 is a timing chart illustrating a second read out operation according to an embodiment.

FIG. 6 is a timing chart of the operations in a second read out mode of the image sensor 100. In the second read out mode, the reset signal N and the image signal (signal A+B) are read out.

The operations from time t600 to time t605 until the reading out of the reset signal N (N reading) is completed are the same as the operations from the time t500 to the time 505 in the first read out mode described using FIG. 5, and thus descriptions thereof are omitted.

At time t606, when the transfer pulse PTXA and the transfer pulse PTXB change to Hi, the charge accumulated in the PD 201A and the charge accumulated in the PD 201B are transferred to the FD 203. Because of this, the electric potential V of the vertical signal line 105 becomes the electric potential corresponding to the charge accumulated in the PD 201A and the PD 201B. This electric potential corresponds to the value of the image signal (signal A+B). Also, at the time t606, the comparator 107 is reset.

At time t607, the DAC 111 starts outputting the reference signal VL again. When the DAC 111 outputs the reference signal VL, the counter 108 starts counting pulses.

At time t608, when the size relationship between the signal A+B and the reference signal VL is reversed, the output level of the comparator 107 changes from Hi to Lo. When the output level of the comparator 107 changes from Hi to Lo, the count value of the counter 108 is held in the column memory 109.

Thereafter, after the reference signal VL transitions to reach a predetermined lower limit value at time t609, when a count value corresponding the signal A+B is output from the column circuit 106 via the horizontal scan circuit 112, reading out of the signal A+B (A+B reading) of the pixel 102 ends.

Thereafter, predetermined signal processing such as subtracting the signal N from the signal A+B is performed. In this manner, the image signal (signal A+B) is obtained from the pixel 102.

Accordingly, in the second read out mode, the reset signal N and the image signal (signal A+B) are read out, but the focus detection signal (signal A or signal B) read out in the first read out mode is not read out.

Note that in the first read out mode, essentially the same reading out as in the second read out mode may be achieved by making the horizontal scan circuit 112 not transfer the signal A at the time t509. A case where the focus detection signal is not transferred in the first read out mode is referred to as a third read out mode.

Figure 7:
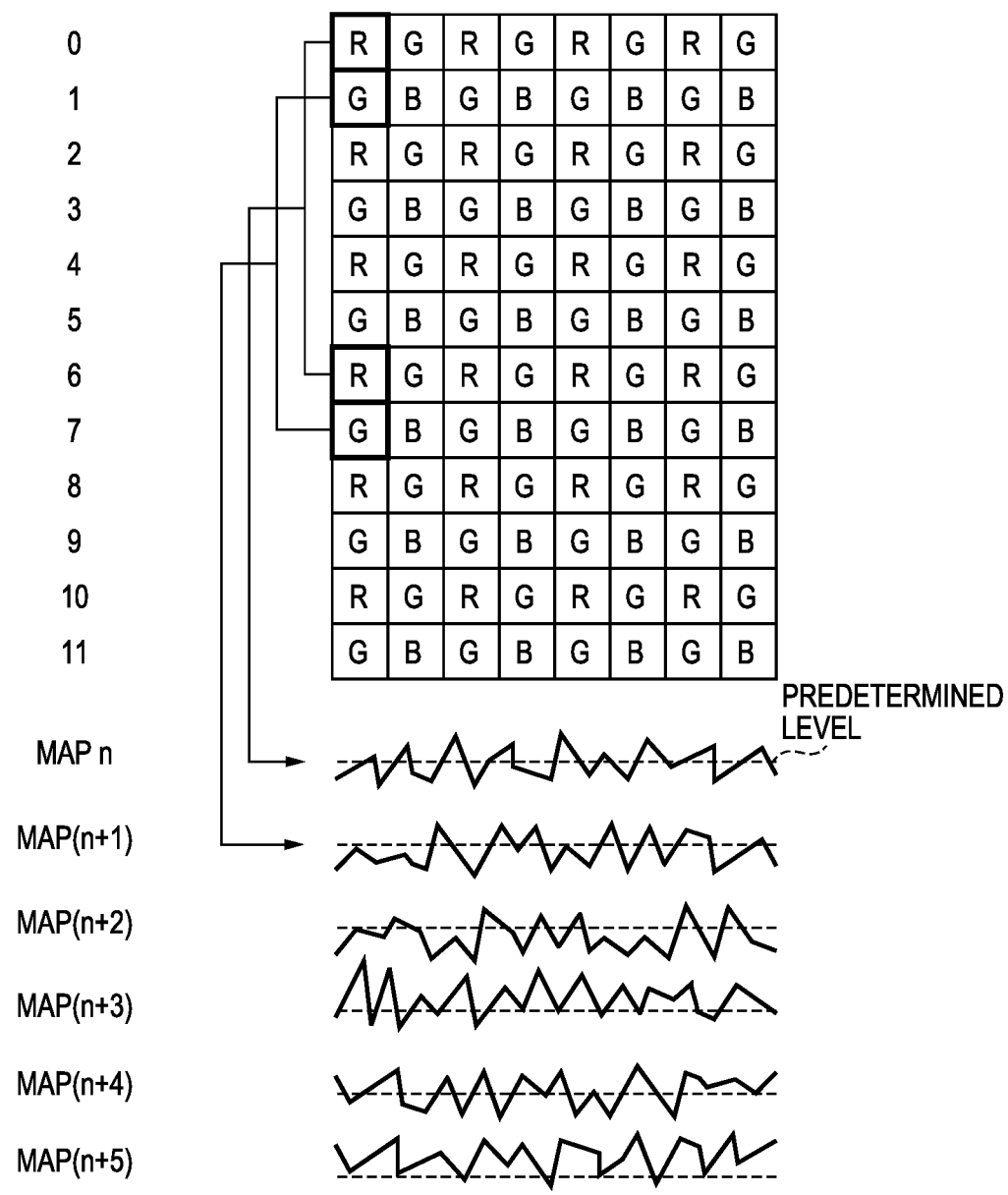
FIG. 7 is a diagram for describing offset caused by vertical signal lines.

FIG. 7 is a schematic diagram for describing a column offset of the pixel 102 included in the pixel portion 101. Column offset is an unevenness in the signal level produced by unevenness in the characteristics between the readout circuits provided associated with the pixel columns. Column offset is superimposed on the image signal as stripe noise.

In FIG. 7, as an example, column offset distribution is illustrated in a state where the pixel portion 101 is not exposed to light based on the signals outputted from the six column circuits 106A to 106F provided in the same pixel column.

For each pixel column, the average value of offset for the plurality of pixels connected to the same vertical signal line 105 is obtained, and map n to map n+5 are the plotted average values for each pixel row. For example, the map n is the distribution in the horizontal direction of the average values of offset obtained for the plurality of pixels 102 included in the 6n-th row (n being an integer equal to or greater than 0) of the pixel portion 101 connected to the vertical signal line 105A. The map (n+1) to the map (n+5) are each a distribution of average values of offset obtained, in a similar manner, for the pixels included in the (6n+1)-th row to the (6n+5)-th row.

As illustrated in FIG. 7, the average values of offset are not constant. Thus, a disconnection between the predetermined offset level indicated by the dashed line and the actual offset level is expressed in the image signal as pattern noise, such as color irregularity in localized areas of the image, vertical lines, and horizontal lines. Also, typically, column offset is different in level in each vertical signal line due to the variation in the voltage level caused by power supply impedance, capacitive coupling, or the like. Thus, in a case where the plurality of vertical signal lines 105A to 105F are provided for each pixel column as in the image sensor 100, periodic horizontal line noise easily occurs. Also, column offset may differ depending on the type of signal (image signal or focus detection signal) read out from the pixel. The difference in offset due to the type of signal read out is mainly caused by a difference in the time taken from when the pixel is reset to when the signal is read out.

Offset correction is performed to suppress unevenness in the offset described above. FIG. 8 is a diagram schematically illustrating offset correction. The image sensor 100 can apply offset correction separately to the signals output from the column circuits 106A to 106F via the first correction circuit 114.

The first correction circuit 114 applies offset correction of subtracting the same value stored beforehand to the signal read out from the pixels 102 disposed in the same column and connected to the same vertical signal line 105.

The values of the signals read out from the pixels are not constant due to the effects of the brightness of the subject, random noise, and the like. However, subtracting the offset average values illustrated via mapping in FIG. 7 corresponds to subtracting a constant value (offset correction value) corresponding to the column.

In the manufacture process of the image sensor or the like, for example, the offset average values calculated as described using FIG. 7 can be calculated as the correction value on the basis of the image signal or focus detection signal read out when the pixel portion 101 is exposed to light. Also, the correction value is stored in the non-volatile board memory 115 provided together with the first correction circuit 114, for example. Furthermore, the first correction circuit 114 can apply offset correction by subtracting the correction value from the signal output to the horizontal signal lines 113 by the horizontal scan circuit 112.

Via offset correction, the unevenness in the offset in the column direction as illustrated in FIG. 8 is suppressed, and offset in the column direction is brought close to the predetermined level. Thus, horizontal line noise and color irregularity can be suppressed.

Note that the second correction circuit 4051 of the signal processing circuit 405 has the same correction function as the first correction circuit 114. The second correction circuit 4051 may obtained the correction value to use in offset correction from the first correction circuit 114 or the board memory 115 of the image sensor 100, or may generate the correction value on the basis of the image signal or focus detection signal read out from the image sensor 100 in a light-blocking state.

Note that the correction value used by the first correction circuit 114 and the second correction circuit 4051 is not necessarily a correction value stored beforehand. For example, in a possible configuration, the correction value may be generated on the basis of a signal obtained from the image sensor 100 just before image capture.

Also, the target of correction is not limited to the offset in pixel values when light is blocked. For example, unevenness in the gain of each vertical signal line 105 may be stored as a correction value in advance and used in gain correction of each column.

Next, FIGS. 9A and 9B will be used to describe the different types of signals read out for each row from the image sensor 100. FIG. 9A is a diagram schematically illustrating a case in which the image signal (signal A+B) and the focus detection signal (signal A or signal B) are read out for all of the rows of the image sensor 100. In FIG. 9A and onward, the image signal is indicated by A+B, and the focus detection signal is indicated by A. In the present embodiment, because six vertical signal line 105A to 105F are provided for each column, the pixel rows of the pixel portion 101 of the image sensor 100 are represented by the 6n-th row to the 6(n+5)-th row (n being an integer equal to or greater than 0).

As illustrated in FIG. 9A, in a case where the image signal and the focus detection signal are read out for all of the pixel rows, the signals are read out from all of the pixel rows in the first read out mode.

FIG. 9B is a diagram illustrating a case in which the image signal (signal A+B) is read out from all of the pixel rows, but the focus detection signal (signal A or signal B) is read out from only a portion of the pixel rows. Specifically, FIG. 9B is a diagram illustrating a case in which the focus detection signal (signal A) is read from the 6n-th row, the 6(n+1)-th row, the 6(n+4)-th row, and the 6(n+5)-th row, and the focus detection signal (signal A) is not read out from the 6(n+2)-th row and the 6(n+3)-th row.

In a case such as that illustrated in FIG. 9B, for the pixel rows for which the image signal and the focus detection signal are both read out, the signals are read out in the first read out mode, and for the pixel rows for which only the image signal is read out, the signal is read out in the second or third read out mode. As illustrated in FIG. 9B, by providing a pixel row for which the focus detection signal is not read out, the signal read out time equivalent to one frame can be cut out.

Hereinafter, a case in which the focus detection signal is read out from all of the pixel rows is referred to as all-row AF read out, and a case in which the focus detection signal is read out from a portion of the pixel rows is referred to as partial AF read out. The read out operation in accordance with the first to third read out modes can be implemented by the control circuit 406 controlling the operation of the TG 110. Also, which rows to read out the focus detection signal from in partial AF read out can be controlled by the control circuit 406 controlling the operation of the TG 110.

Next, how offset correction operations are shared between the first correction circuit 114 and the second correction circuit 4051 will be described using FIG. 10. FIG. 10 is a diagram illustrating an example of all-row AF read out.

As illustrated in FIG. 10, in the case of all-row AF read out, at the first correction circuit 114, offset correction is applied to the image signal (signal A+B) and offset correction is not applied to the focus detection signal (signal A). On the other hand, the second correction circuit 4051 applies offset correction to the focus detection signal (signal A) and does not apply offset correction to the image signal (signal A+B).

Specifically, the control circuit 406, for the image signal (signal A+B), sets the first correction circuit 114 to apply offset correction and output the signal and, for the focus detection signal (signal A), sets the first correction circuit 114 to output the signal without applying offset correction. Also, the control circuit 406, for the image signal (signal A+B), sets the second correction circuit 4051 to not apply offset correction and, for the focus detection signal (signal A), sets the second correction circuit 4051 to apply offset correction.

Thus, regarding the operations of the first read out mode illustrated in FIG. 5, the first correction circuit 114 writes the focus detection signal (signal A) output at the time t509 to the memory 407 without applying offset correction. Then, the second correction circuit 4051 (signal processing circuit 405) reads out the focus detection signal (signal A) from the memory 407 and starts applying offset correction. The second correction circuit 4051 (signal processing circuit 405) then writes the post-offset correction focus detection signal (signal A) again to the memory 407.

Thereafter, the first correction circuit 114 applies offset correction to the image signal (signal A+B) output at the time t513 and writes the image signal to the memory 407. On the other hand, the second correction circuit 4051 (signal processing circuit 405) does not apply offset correction to the image signal (signal A+B) written to the memory 407.

The signal processing circuit 405 generates the focus detection signal (signal B) from the post-offset correction image signal (signal A+B) and the focus detection signal (signal A) written to the memory 407.

In this manner, in the present embodiment, in a case where the image signal and the focus detection signal are read out from the image sensor, correction processing applied to each signal is applied at a correction circuit within the image sensor for one signal and applied at a correction circuit outside of the image sensor for the other signal. Accordingly, in a case where different correction values are used for each type of signal read out, the amount of correction values held within the image sensor can be reduced. This effect is particularly significant in a case where a plurality of vertical signal lines are provided for each pixel column and correction values are used for each vertical signal line.

Also, in a case where a plurality of types of image signals are read out corresponding to a single instance of exposure processing, such as with the image signal and the focus detection signal, there are restrictions on the upper limit of the continuous shooting speed due to the time required for reading out. In the present embodiment, because the correction processing is shared between two correction circuits depending on the signal type, the time required for reading out can be reduced, leading to an improvement in continuous shooting speed.

Note that in the examples described above, offset correction is applied to the image signal and the focus detection signal. However, offset correction may also be applied to the reset signal N. In this case, offset correction may be applied to the reset signal N by either the first correction circuit 114 or the second correction circuit 4051. The control circuit 406 sets a correction circuit storing the correction values for the reset signal N to apply offset correction to the reset signal N.

Second Embodiment

Next, the second embodiment of the present invention will be described. Note that the present embodiment is the same as the first embodiment except in relation to the operation of the second correction circuit 4051. Thus, the following description will focus on the operation of the second correction circuit 4051 according to the present embodiment.

FIG. 11 is a diagram illustrating read out and correction operations according to the second embodiment similar to those illustrated in FIG. 10. In this embodiment, the image signal (signal A+B) and the focus detection signal (signal A) are read out for all of the rows as in the first embodiment.

The offset correction processing by the first correction circuit 114 on the image signal (signal A+B) is the same as in the first embodiment. However, the second correction circuit 4051 that corrects the focus detection signal generates the focus detection signal to be corrected from the focus detection signal read out from the 6n-th row to the (6n+5)-th row pixel connected to the vertical signal lines 105A to 105F.

The second correction circuit 4051 combines the pixel signals from a plurality of rows into a single row. For example, the second correction circuit 4051 combines the focus detection signals read out from the pixels of the 6n-th row, the (6n+1)-th row, and the (6n+2)-th row into a single-row focus detection signal. Also, the second correction circuit 4051 combines the focus detection signals read out from the pixels of the (6n+3)-th row, the (6n+4)-th row, and the (6n+5)-th row into a single-row focus detection signal. The signals may be combined by adding together the focus detection signals read out from the rows of the same column and finding the average.

Note the second correction circuit 4051 is set by the control circuit 406 in terms of whether or not the second correction circuit 4051 performs combining and what rows of pixel signal to combine. Also, in a case where the second correction circuit 4051 supports a plurality of combining methods, the second correction circuit 4051 is set by the control circuit 406 in terms of the used combining method.

Then, the second correction circuit 4051 applies offset correction to the generated two rows of focus detection signal. Accordingly, the correction value used by the second correction circuit 4051 is a correction value corresponding to the post-combination focus detection signal. The correction value, for example, can be generated by combining the correction value used in a case where combining is not performed (the correction value used by the second correction circuit 4051 in the first embodiment) and the focus detection signal in a similar manner. Also, a correction value corresponding to the post-combination focus detection signal may be acquired beforehand and held.

In this manner, by cutting out a focus detection signal to apply correction to, the amount of correction values used by the second correction circuit 4051 can be reduced. The accuracy of correction is reduced by combining in this manner. However, because the correction accuracy required for the focus detection signal is less than that required for the image signal, the effect of reducing the data amount of correction values is significantly large. In a case where a plurality of vertical signal lines are provided for each pixel column, unless combining is performed, correction values are need for each vertical signal line, making the effect significantly large.

Note that, as illustrated in FIG. 11, in a configuration in which six vertical signal lines are provided for each pixel column, a common correction value is used for signals read out from three adjacent vertical signal lines. However, the number of vertical signal lines using a common correction value and the positional relationship here are simply examples.

For example, the 6n-th row to the (6n+5)-th row may be combined into one row, and a common correction value may be used for all of the focus detection signals. Also, in a case where the pixel portion 101 is provided with a primary color Bayer arrangement color filter as illustrated in FIG. 1, the focus detection signals read out from the plurality of pixels provided with a color filter of the same color may be combined. Specifically, the signals read out from the pixels of the 6n-th row, the (6n+2)-th row, and the (6n+4)-th row may be combined into one row, and the signals read out from the pixels of the (6n+1)-th row, the (6n+3)-th row, and the (6n+5)-th row may be combined into one row.

Also, instead of performing all-row AF read out, partial AF read out (FIG. 9B) may be performed. In this case, the time required to read out the signal A and the time required for combination at the second correction circuit 4051 can be reduced. The second correction circuit 4051 applies offset correction using the correction value corresponding to the read out method and combining method of the focus detection signals.

In the present embodiment, in addition of the effect of the first embodiment, the storage capacity and processing time required for offset correction of the focus detection signals can be reduced while maintaining the correction accuracy of the image signal.

Third Embodiment

Next, a third embodiment of the present invention will be described. Note that the present embodiment is the same as the first embodiment except in relation to the operation of the second correction circuit 4051. Thus, the following description will focus on the operation of the second correction circuit 4051 according to the present embodiment.

FIG. 12 is a diagram illustrating read out and correction operations according to the third embodiment similar to those illustrated in FIG. 10. The read out of the image signal (signal A+B) and the offset correction of the image signal (signal A+B) are the same as in the first embodiment.

However, regarding the focus detection signal (signal A), all-row AF read out may be used (FIG. 12A) or partial AF read out (FIG. 12B) may be used. The method for reading out the focus detection signal is associated to the shooting mode of the image capture apparatus 400 beforehand, for example. Accordingly, the control circuit 406 determines whether to use all-row AF read out or partial AF read out as the method for reading out the focus detection signal from the image sensor 100 depending on the set shooting mode and set the method for reading out in the TG 110. Also, in a case where combining the pixel signals is performed at the second correction circuit 4051, the control circuit 406 sets the second correction circuit 4051 with the rows to be combined and the combining method.

For example, for a shooting mode capturing a scene with a low illuminance level or a scene likely to have decreased AF accuracy, all-row AF read out is performed, and for a shooting mode capturing scenes other than these, partial AF read out is performed. Alternatively, for a shooting mode that needs a high shooting frame rate, partial AF read out may be performed, and for other shooting modes, all-row AF read out may be performed. Note that the associated read out methods and shooting modes described here are simply examples, and other associations are possible.

Also, the read out method may be determined depending on other conditions and is not limited to be determined depending on the shooting mode. For example, in a case where power consumption needs to be reduced or a case where operation is set to low power consumption, partial AF read out may be performed.

In the example illustrated in FIG. 12B, the focus detection signal (signal A) is read out from the pixels from rows other than the (6n+2)-th row and the (6n+5)-th row when partial AF read out is performed. However, the number of rows for which signals are not read out and the arrangement are not limited to this configuration.

In a case of all-row AF read out, as in the second embodiment, the second correction circuit 4051 generates a focus detection signal of two rows by combining the three consecutive rows of the focus detection signal (signal A) of the six rows into one row each.

On the other hand, in a case of partial AF read out, the second correction circuit 4051 combines the signal read out from the pixel of the 6n-th row and the signal read out from the pixel of the (6n+1)-th row into one row. The second correction circuit 4051 further generates a focus detection signal of two rows by combining the signal read out from the pixel of the (6n+3)-th row and the signal read out from the pixel of the (6n+4)-th row into one row. Combining may including adding together the pixel value for each column and finding the average. In this manner, the amount of reading out of focus detection signals in partial AF read out can be reduced, and an improvement in the shooting frame rate and a reduction in the power consumption can be achieved.

According to the present embodiment, as in the second embodiment, the data amount of correction values used when applying offset correction to focus detection signals can be reduced. Specifically, in the case of all-row AF read out and the case of partial AF read out, only correction values of two rows need to be stored.

Note that in the present embodiment, the number of rows after combining the focus detection signals is the same in a case of all-row AF read out and the case of partial AF read out. Furthermore, rows included in the rows combined in the case of all-row AF read out are combined in the case of partial AF read out. Thus, if the data amount of the correction values to be prepared needs to be reduced, the correction values used in the case of all-row AF read out may also be used in the case of partial AF read out. This allows the data amount of the correction values to be further reduced.

The correction value, for example, can be generated by combining the correction value used in a case where combining is not performed (the correction value used by the second correction circuit 4051 in the first embodiment) in a similar manner to the method for combining row data at the second correction circuit 4051.

The second correction circuit 4051 applies offset correction by subtracting the corresponding correction value from the post-combination two rows of focus detection signals.

In the present embodiment, in addition to the effects of the second embodiment, by using the partial AF read out in combination, the time required for reading out the focus detection signal and correction can be reduced. Also, by using a configuration in which the correction values in the case of all-row AF read out are also used in the case of partial AF read out, the storage capacity for correction values can be reduced in a similar manner to the second embodiment.

Fourth Embodiment

Next, a fourth embodiment of the present invention will be described. The fourth embodiment relates to performing correction operation in accordance with the type of signal stored by the image capture apparatus 400. With the image capture apparatus 400, the type of signal stored can be changed via user settings. For example, the image capture apparatus 400 can be set to store or not store the focus detection signal in addition to the image signal.

FIG. 13A is a diagram schematically illustrating a read out operation and a correction operation in a case where focus detection signal is stored. In this case, all of the rows of the image signal (signal A+B) and the focus detection signal (signal A) are read out. In this manner, by storing the focus detection signal for all pixels, the focusing distance can be adjusted and ghosting removal can be performed after image capture. Because the signal A is used as the image signal in these types of processing, offset correction needs to be applied at a similar accuracy to that of the signal A+B.

Accordingly, in a case where the focus detection signal (signal A) is stored, as in the first embodiment, offset correction is applied at the first correction circuit 114 to the signal A+B. and offset correction is applied at the second correction circuit 4051 of the signal A.

In a case where the focus detection signal (signal A) is not stored, as with the focus detection signal (signal A) in the first to third embodiments, the focus detection signal may be used only in AF operations of the image capture apparatus 400. In this case, as illustrated in FIG. 13B, partial AF read out is performed, and offset correction is applied at the second correction circuit 4051 to the focus detection signal (signal A). Note that in a case where the focus detection signal (signal A) is not stored, as in the second embodiment (FIG. 11A) or the third embodiment (FIG. 12B), offset correction may be applied to the focus detection signal (signal A).

The control circuit 406, depending on the settings of the signal to be stored, sets the TG 110, the first correction circuit 114, and the second correction circuit 4051 to perform read out as illustrated in FIGS. 13A and 13B and perform offset correction.

According to the present embodiment, in both a case where the focus detection signal is stored in addition to the image signal and a case where the focus detection signal is not stored, appropriate offset correction can be applied to the focus detection signal. Also, by the offset correction processing being shared between two correction circuits, the data amount of the correction values held in the image sensor can be reduced and the time required for offset correction can be reduced.

Note that in a case where the focus detection signal (signal A) is stored, a configuration may be used in which offset correction is applied at the first correction circuit 114 to not only the image signal (signal A+B) but also the focus detection signal (signal A). In a case where the data amount of the correction values held in the image sensor needs to be reduced, a configuration may be used in which the correction values are input from outside of the image sensor.

Fifth Embodiment

Next, a fifth embodiment of the present invention will be described. The present embodiment relates to offset correction in a case where the plurality of vertical signal lines provided for each column are divided into two groups and the read out cycle (read out rate) differs between the vertical signal lines of the first group and the vertical signal lines of the second group.

Figure 14A:
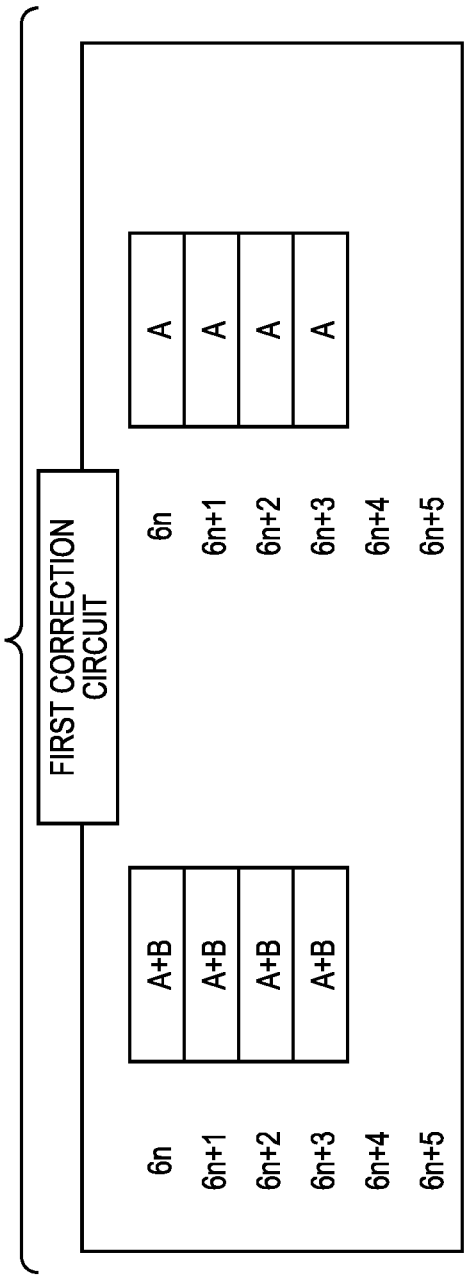
FIGS. 14A and 14B are schematic diagrams of a read out operation and a correction operation according to a fifth embodiment.
Figure 14B:
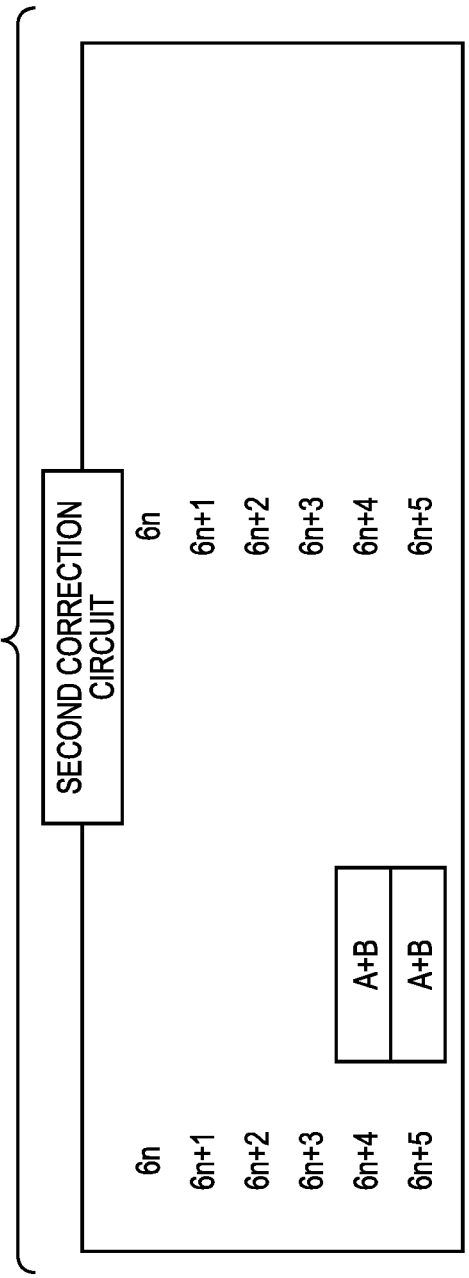

FIGS. 14A and 14B are diagrams illustrating read out and correction operations according to the fifth embodiment similar to those illustrated in FIG. 10. In the present embodiment, the six vertical signal lines 105A to 105F provided for each column are divided into two groups of the vertical signal lines 105A to 105D and the vertical signal lines 105E to 105F and the read out cycle of each group is made different.

Specifically, the image signal (signal A+B) and the focus detection signal (signal A) are read out from the pixels of the vertical signal lines 105A to 105D (6n-th row to (6n+3)-th row) in a first cycle (FIG. 14A). The read out pixel signals are used in image data generation and focus detection.

Also, the image signal (signal A+B) is read out from the pixels of the vertical signal lines 105E and 105F ((6n+4)-th row to (6n+5)-th row) in a second cycle shorter than the first cycle, and the focus detection signal is not read out (FIG. 14B). The read out pixel signals are typically referred to as multi-stream signals and are used in flicker detection for environmental light and exposure control.

Note that the method for dividing the vertical signal lines 105 into groups and the type of signal read out described here are simply examples. For example, only the image signal may be read out in the first cycle, and the focus detection signal may be read out in the second cycle and have offset correction applied to it at the second correction circuit 4051. However, regarding the number of vertical signal lines read out in the second cycle, because the second cycle is shorter than the first cycle, the number of vertical signal lines read out in the second cycle is typically less than the number read out in the first cycle.

This kind of control of the read out cycle in accordance with the vertical signal lines 105 can be implemented by the control circuit 406 controlling the operation of the TG 110.

In the present embodiment, offset correction is applied to the pixel signal read out in the first cycle at the first correction circuit 114 and applied to the pixel signal read out in the second cycle at the second correction circuit 4051. Note that the relationship between the correction circuit and the pixel signal to be corrected may be reversed. Basically, in a case where the pixel signals are combined and offset correction is applied, the second correction circuit 4051 is used. However, in a case where combining of the pixel signals does not follow, offset correction may be applied at either the first correction circuit 114 or the second correction circuit 4051.

In the example illustrated in FIGS. 14A and 14B, a total of eight types of correction values are held for each of the vertical signal lines 105A to 105D in the board memory 115 and for each type of pixel signal to be read out. Also, two types of correction values for image signals for each of the vertical signal lines 105E to 105F are held in the memory 407. As in the embodiments described above, the correction values held by the board memory 115 may be held beforehand or may be acquired from the memory 407.

Note that at the second correction circuit 4051, offset correction may be applied after combining the pixel signals (signal A+B) read out from the pixels of the (6n+4)-th row to (6n+5)-th row into one row. In this case, the amount of correction values used at the second correction circuit 4051 can be reduced by half.

The control circuit 406 sets the first correction circuit 114 to apply offset correction only to the pixel signal read out to the horizontal signal lines 113A to 113D corresponding to the vertical signal lines 105A to 105D. Also, the control circuit 406 sets the second correction circuit 4051 to apply offset correction only to the pixel signal read out to the horizontal signal lines 113E and 113F corresponding to the vertical signal lines 105E and 105F. The control circuit 406 can also set the second correction circuit 4051 in terms of whether or not to perform combining before correction.

According to the present embodiment, in a case where the read out cycle differs depending on the pixel row, offset correction is applied to the pixel signal read out in the first cycle at the first correction circuit and applied to the pixel signal read out in the second cycle at the second correction circuit. Accordingly, the number of correction values held by the image sensor can be reduced, and the load of offset correction can be shared.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-007365, filed on Jan. 20, 2021, which is hereby incorporated by reference herein in its entirety.

What is claimed is:

1. An image capture apparatus, comprising:
an image sensor that includes a pixel array in which a plurality of pixels are disposed in rows and columns and a plurality of column signal lines provided for each column of the pixels, the image sensor being capable of reading out a plurality of types of pixel signals including a first pixel signal and a second pixel signal from the pixel array;
a first correction circuit; and
a second correction circuit, wherein
the first correction circuit and the second correction circuit share application of correction of offset caused by a difference in column signal lines where the pixel signals are read out to.

2. The image capture apparatus according to claim 1, wherein
the first correction circuit is provided in the image sensor, and the second correction circuit is provided outside of the image sensor.

3. The image capture apparatus according to claim 1, wherein
the first correction circuit applies the correction to a first pixel signal, and the second correction circuit applies the correction to a second pixel signal.

4. The image capture apparatus according to claim 3, wherein
the second correction circuit applies the correction after combining the second pixel signals of a plurality of rows into one row.

5. The image capture apparatus according to claim 4, wherein
the second correction circuit performs the combining so that a number of rows after the second pixel signals are combined is equal in a case where the second pixel signals are read out from all rows of pixels and in a case where the second pixel signals are read out from a portion of rows of pixels.

6. The image capture apparatus according to claim 5, wherein
the second correction circuit applies correction to a pixel signal after the combining using an identical correction value in a case where the second pixel signals are read out from all rows of pixels and in a case where the second pixel signals are read out from a portion of rows of pixels.

7. The image capture apparatus according to claim 5, wherein
depending on a setting of the image capture apparatus, a case where the second pixel signals are read out from all rows of pixels or a case where the second pixel signals are read out from a portion of rows of pixels are changed to.

8. The image capture apparatus according to claim 7, wherein
the setting is a shooting mode.

9. The image capture apparatus according to claim 3, wherein
in a case where the first pixel signal and the second pixel signal are stored, the first pixel signal and the second pixel signal are read out from all rows of pixels; and
in a case where the first pixel signal is stored and the second pixel signal is not stored, the first pixel signal is read out from all rows of pixels and the second pixel signal is read out from a portion of rows of pixels.

10. The image capture apparatus according to claim 3, wherein
in a case where a first pixel signal is read out from a first group of the plurality of vertical signal lines in a first cycle and the first pixel signal is read out from a second group of the plurality of vertical signal lines in a second cycle shorter than the first cycle,
the first correction circuit applies the correction to one of the first pixel signals with a different read out cycle, and the second correction circuit applies correction to another one of the first pixel signals with a different read out cycle.

11. The image capture apparatus according to claim 10, wherein
in a case where the second pixel signal is read out in the first cycle, the correction is applied to the second pixel signal at a correction circuit that applies the correction to the first pixel signal read out in the first cycle; and
in a case where the second pixel signal is read out in the second cycle, the correction is applied to the second pixel signal at a correction circuit that applies the correction to the first pixel signal read out in the second cycle.

12. The image capture apparatus according to claim 10, wherein
a number of column signal lines belonging to the first group is greater than a number of column signal lines belonging to the second group.

13. The image capture apparatus according to claim 3, wherein
the first pixel signal is an image signal, and the second pixel signal is a focus detection signal.

14. The image capture apparatus according to claim 3, wherein
the pixel includes a plurality of photoelectric conversion units, the first pixel signal is a pixel signal read out from the plurality of photoelectric conversion units, and the second pixel signal is a pixel signal read out from a portion of the plurality of photoelectric conversion units.

15. The image capture apparatus according to claim 1, wherein
the correction value used in the correction by the first correction circuit is held in a memory included in the image sensor, and a correction value used in the correction by the second correction circuit is held in a memory provided outside of the image sensor.

16. The image capture apparatus according to claim 15, wherein
a correction value held in a memory included in the image sensor has been acquired from a memory provided outside of the image sensor.

17. A control method for an image capture apparatus including an image sensor that includes a pixel array in which a plurality of pixels are disposed in rows and columns and a plurality of column signal lines provided for each column of the pixels, the image sensor being capable of reading out a plurality of types of pixel signals including a first pixel signal and a second pixel signal from the pixels, a first correction circuit, and a second correction circuit, the method comprising:
controlling the first correction circuit and the second correction circuit to share applying correction of offset caused by a difference in column signal lines where the pixel signals are read out to.

18. A non-transitory computer-readable medium storing a program executable by a computer included in an image capture apparatus, wherein the image capture apparatus including an image sensor that includes a pixel array in which a plurality of pixels are disposed in rows and columns and a plurality of column signal lines provided for each column of the pixels, the image sensor being capable of reading out a plurality of types of pixel signals including a first pixel signal and a second pixel signal from the pixels, a first correction circuit, and a second correction circuit, the program, when executed by the computer, causes the computer to implement a control method for an image capture apparatus comprising, controlling the first correction circuit and the second correction circuit to share applying correction of offset caused by a difference in column signal lines where the pixel signals are read out to.

* * * * *